April 13, 1943.  C. G. BLISS,  2,316,310
FEED CONTROL MEANS FOR WEIGHING APPARATUS
Filed Nov. 8, 1937  2 Sheets-Sheet 1

Inventor
CARL G. BLISS.
By William E. Hall.
Attorney

April 13, 1943.  C. G. BLISS  2,316,310
FEED CONTROL MEANS FOR WEIGHING APPARATUS
Filed Nov. 8, 1937  2 Sheets-Sheet 2

Inventor
CARL G. BLISS.
By
*William E. Hall*
Attorney

Patented Apr. 13, 1943

2,316,310

UNITED STATES PATENT OFFICE 2,316,310

FEED CONTROL MEANS FOR WEIGHING APPARATUS

Carl G. Bliss, Long Beach, Calif., assignor to Standard Steel Works, Los Angeles, Calif., a corporation of California Application November 8, 1937, Serial No. 173,450

2 Claims. (Cl. 249—2)

My present invention relates to feed control means for weighing apparatus.

One of the principal objects of this invention is to provide improvements over my former inventions for weighing machines, such as that disclosed in U. S. Reissue Patent No. 20,141, for Measuring apparatus, the principal improvement being the provision of means whereby the feed or supply of an ingredient or series of ingredients may be substantially instantaneously shut off for obtaining accurate weighing or measuring of the ingredient or ingredients, and also for rapid weighing or measuring successive amounts of one or more ingredients, without necessitating, what is known as, dribble weighing.

An object also is the provision of a novel conveyor means for producing such results, and in which a separate conveyor is provided for each ingredient supply source and in which each conveyor is separately controlled.

An important object also is the provision of a feed or discharge conveyor in connection with a storage bin having a constantly open discharge passage at its lower end, but in which the feed or discharge conveyor is so located with respect to the opening or passage that the conveyor is constantly loaded, but in which the slightest movement thereof will cause the material of the bin to be discharged, and immediately to be shut off when the movement of the conveyor is stopped.

A further object of this invention is the provision of a feed or discharge conveyor means in connection with storage bins, in which the discharge openings of a plurality of bins are located in substantial alignment, and in which separate feed or discharge conveyors move outwardly or laterally in substantial transverse directions from such alignment of openings, whereby a substantially narrow construction is provided for the bins and feed or discharge conveyor means.

With these and other objects in view, as will appear hereinafter, I have devised a feed control means for weighing machines which has several novel features of construction, combination, and arrangement of parts and portions, as will be hereinafter described in detail and particularly set forth in the appended claims, reference being had to the accompanying drawings and to the characters of reference thereon, which form a part of this application, in which:

The structure shown is similar to those used in concrete batching plants or asphalt paving plants.

Figure 5:
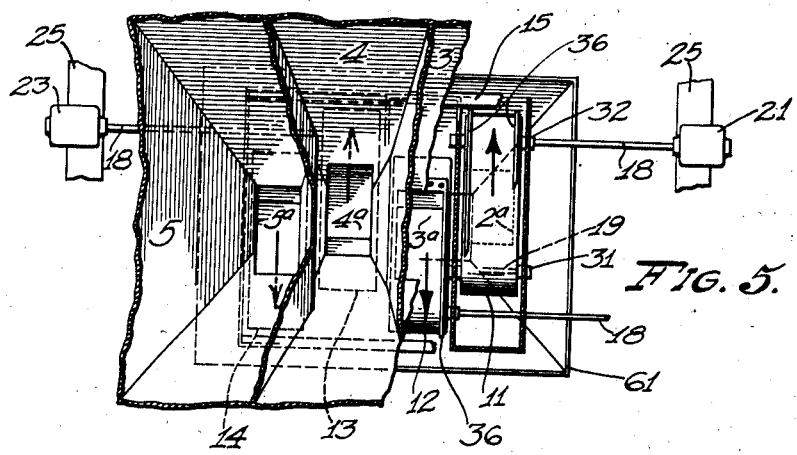
Fig. 5 is a fragmentary sectional view in plan of my feed control means, taken through 5—5 of Fig. 1; and, Fig. 6 is a wiring diagram of the electric circuit for controlling one form of a weighing apparatus embodying my feed control means.
Figure 6:
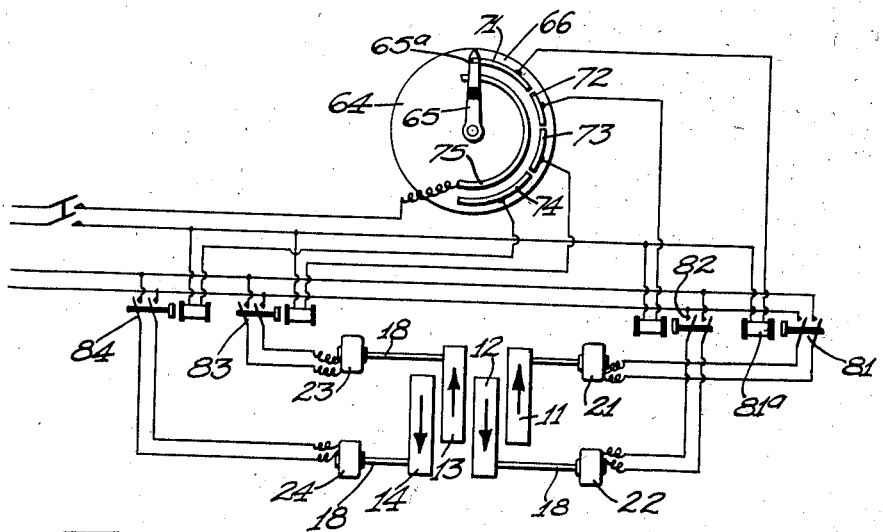

It may, for convenience, be supported on uprights 1, at the upper end portions of which are mounted a bin structure which, as here shown, consists of separate storage bins 2, 3, 4, and 5. These bins have downwardly converging bottoms with the lower ends or vertexes open, as designated by $2^a$, $3^a$, $4^a$, and $5^a$ in Figs. 2 and 5. The front walls are inclined and raised above the bottom of the bins, forming lateral openings for the bins, as indicated by $5^b$ in Fig. 2. The latter discharge openings of successive bins are located at alternate sides, as will be hereafter described.

Immediately below the bins are continuous horizontal belt conveyors 11, 12, 13, and 14, respectively, which provide separately contracted moving bottoms for the separate bins. These conveyors are positioned under the bottom openings, $2^a$, $3^a$, $4^a$, and $5^a$ of the respective bins and are arranged in alignment with the respective openings, and the discharge ends of which extend considerable distances beyond the above mentioned openings, one of which is indicated by $5^b$ in Fig. 2.

The conveyors are positioned in separate compartments in a frame 15, and the belts of the conveyors are mounted on sprockets 16 and 17 carried respectively on shafts 18 and 19, supported in the separating walls of the frame 15. As shown in the drawings, the shafts 18 of the conveyors 11 and 13 are positioned in substantial alignment and extend from the conveyors in opposite directions. To the ends of these shafts are connected drive motors 21 and 23, respectively, which motors are mounted on suitable cross members 25 of the supporting frame. The last mentioned shafts 18 are located at one side of the bin structure. At the other side of the bin structure are similar shafts 18 which drive the sprockets 16 of the conveyor belts 12 and 14. The latter shafts are driven by motors 22 and 24, respectively, which are also mounted on the cross members 25 of the frame.

The shafts 19 are mounted in sliding journals 31, which are resiliently separated from the journals 32, supporting the shafts 18, by offset spring rods 33. Such mounting of the journals keeps the belt taut at all times and tight against the bottom of the bins.

Figure 1:
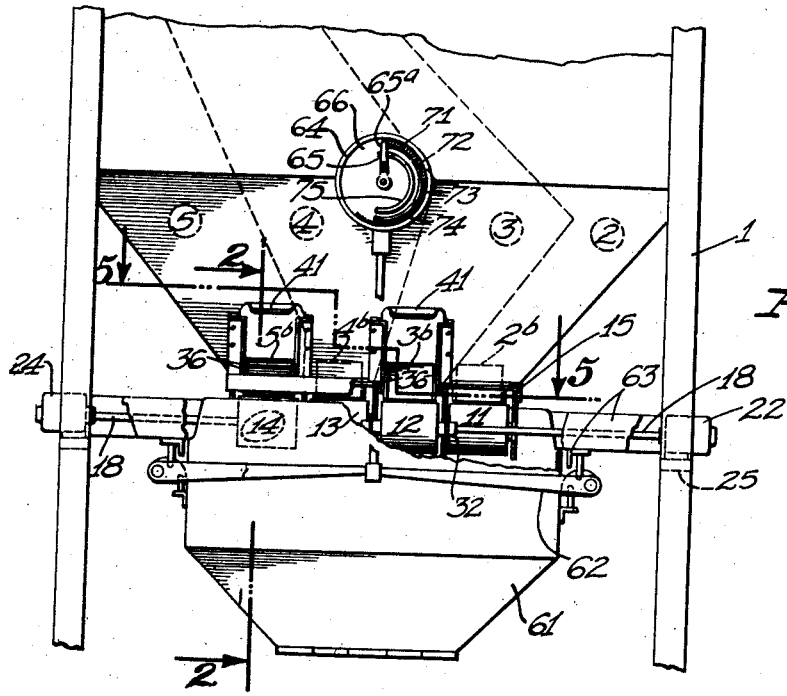
Fig. 1 is a fragmentary front elevational view of a weighing apparatus embodying my invention of the feed control means.
Figures 2, 3, 4:
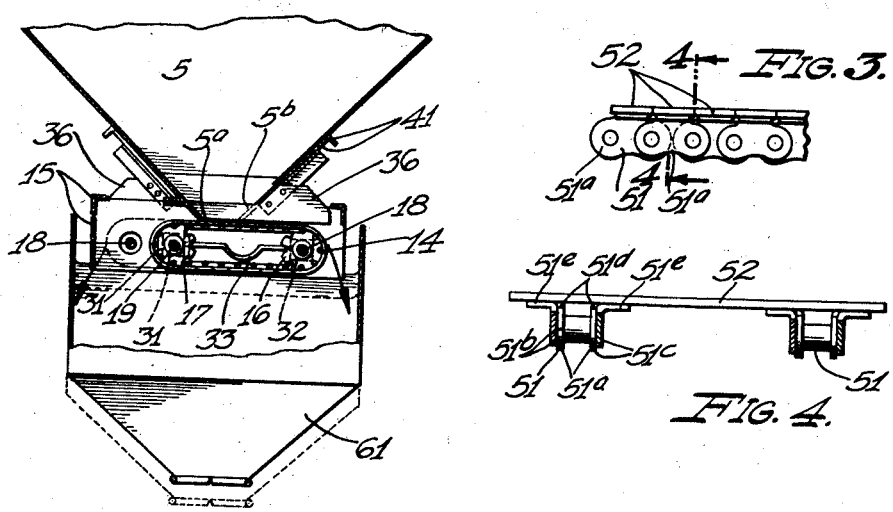
Fig. 2 is a fragmentary sectional elevation thereof taken at 2—2 of Fig. 1.
Figs. 3 and 4 are, respectively, enlarged fragmentary side and transverse elevations of a section of the link belt conveyor for feeding or discharging the materials from the bins.

At both sides of the side openings, one of which is shown in and designated $5^b$ in Fig. 2, are wings 36 which extend outwardly from the bins in the direction of the moving conveyor belts and inwardly from the edges of the latter, for confining materials, discharged from the bins, on the conveyor belts.

On the sides of the bins, facing the receding conveyor belts, are provided gates 41 for varying the size of the bin openings to restrict the discharge of the materials from the bins, or for wholly closing the discharge openings.

The belt conveyors 11, 12, 13 and 14 may, for ordinary purposes, be fabric or rubber belts, but when the apparatus is used for such materials as hot asphalt, or the like, the conveyors are preferably made as shown. As illustrated, each belt consists of a pair of link belt chains 51 mounted on the sprockets 16 and 17 and transversely connected by flat metal bars 52, placed edge to edge on the top side of the conveyor.

The chains 51 consist of pivoted links $51^a$. Each link consists of laterally spaced apart link members $51^b$ and $51^c$, both of which are provided at the top with oppositely extending bar securing lugs, the lugs on the inner links being designated $5^d$, and those of the outer links being designated $5^e$. Each bar is secured at its opposite end portions to both lugs on oppositely positioned links of both chains.

The upper faces of the bars provide substantially a plate-like bottom for the respective bin, which extends as such plate-like bottom to the discharge end of the conveyor.

The conveyors discharge into a common receptacle 61, known here as a weigh hopper, which is positioned directly below the conveyors, and is suspended from levers or arms 62, forming part of the weighing scale, and which are operatively connected to the means supporting the weigh hopper from the cross members 63 of the frame 1. The free ends of the arms are connected by suitable means to the dial type weighing scale 64 which has a pivoted pointer 65 moving over a weight indicating scale 66.

On the face of the dial and about the axis of the pointer are arranged arcuate contacts 71, 72, 73, and 74, and another arcuate contact 75, spaced radially inwardly but coextensive circumferentially with the first contacts. The pointer has a conducting portion $65^a$, insulated from the other part of the pointer, for electrically connecting the contact 75 with one of the other contacts. The arcuate or circumferential extents of the contacts 71, 72, 73 and 74 correspond with the angular movements of the pointer when measuring, on the dial scale, a corresponding amount of material ingredient, aggregate, or the like, discharged from the conveyors, into the weigh hopper.

The closing of the circuit between the contacts 71 and 75 energizes relay $81a$ which closes switch 81 and thus operates the motor 21 and moves the conveyor 11 to discharge material from the bin 2. When the designated or predetermined amount has been discharged into the weigh hopper, the pointer is moved through a corresponding angle and disconnected from the contact 71, and engages the contact 72, stopping the motor 21 and starting the motor 22, and respectively stopping the conveyor 11 and starting the conveyor 12 and, therefore, discharge of material from the bin 3. The amounts of materials discharged from the bins 3, 4, and 5 are regulated similarly by the contacts 72, 73, and 74, relays 82, 83 and 84, and the consequent stopping and starting of the corresponding conveyors. Such arrangement and operation of the mechanism illustrated and described provides extremely accurate and rapid weighing or measuring of many ingredients or materials in succession.

Other details of construction and other necessary features form no part of this invention and may be adapted from my Reissue Patent No. 20,141.

Though I have shown and described a particular construction, combination and arrangement of parts and portions, I do not wish to be limited to the same, but desire to include in the scope of my invention the construction, combination, and arrangement substantially as set forth in the appended claims.

I claim:

1. In an apparatus of the class described, a plurality of bins positioned immediately adjacent each other, each having a downwardly converging bottom, the vertex of the bottom and a portion of one side of each bin being open, some of the bins being open at one side and the others being open at the opposite side, measuring means, separate lateral conveyors, all located in substantially the same horizontal plane, one end of each forming a moving bottom below the open vertex and side opening of each bin, and extending with its other end beyond the respective bin at the side thereof having said side opening, said other end discharging into the measuring means, means responsive to the material in the latter, for measuring the amount thereof, and means for separately operating each of the conveyors, the latter means being controlled responsive to the movements of the measuring means, the conveyor operating means for the conveyors extending in one direction from the bins being located at the opposite lateral sides of the latter conveyors, and the conveyor operating means for the conveyors extending in the opposite direction being also located at the opposite lateral sides of the latter conveyors.

2. In an apparatus of the class described, a plurality of bins positioned immediately adjacent each other, each having a downwardly converging bottom, the vertex of the bottom and a portion of one side of each bin being open, some of the bins being open at one side and the others being open at the opposite side, separate lateral conveyors, all located in substantially the same horizontal plane, one end of each forming a moving bottom below the open vertex and side opening of one bin, and extending with its other end beyond the respective bin at the side thereof having said side opening, means for separately operating each of the conveyors, the conveyor operating means for the conveyors, which extend in one direction from the bins, being located at the opposite lateral sides of the latter conveyors, and the conveyor operating means for the conveyors, which extend in the opposite directions from the bins, being also located at the opposite lateral sides of the latter conveyors.

CARL G. BLISS.